Nov. 27, 1951  E. D. SCOTT ET AL  2,576,365
ADJUSTABLE VEHICLE SEAT
Filed June 5, 1946  2 SHEETS—SHEET 1
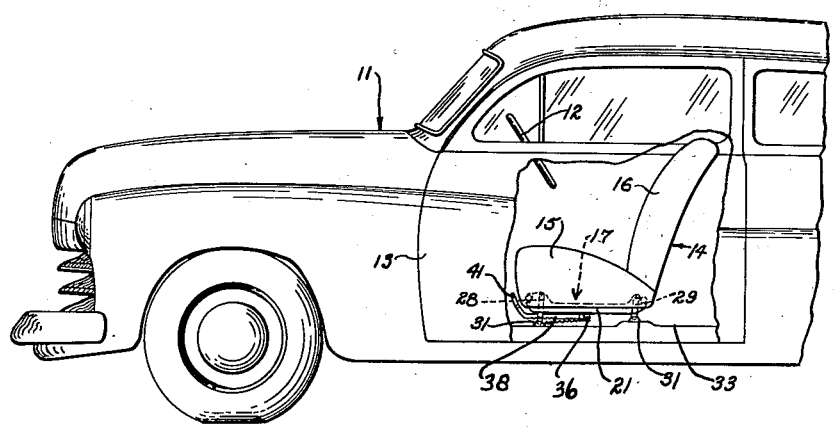
Fig. 1
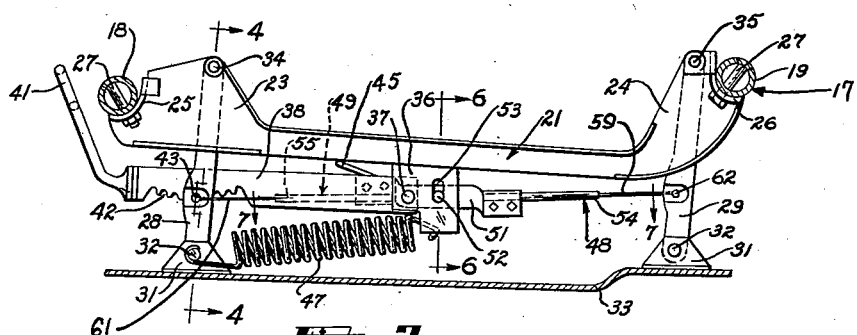
Fig. 2
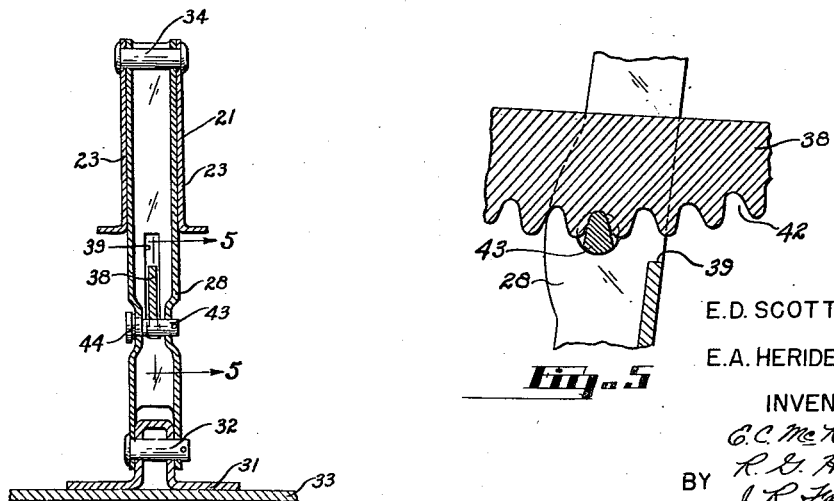
Fig. 4
Fig. 5
E. D. SCOTT
E. A. HERIDER
INVENTORS.
BY C. C. McRae
R. G. Harris
J. R. Faulkner
T. H. Oster
ATTORNEYS.

Nov. 27, 1951     E. D. SCOTT ET AL     2,576,365
ADJUSTABLE VEHICLE SEAT
Filed June 5, 1946     2 SHEETS—SHEET 2
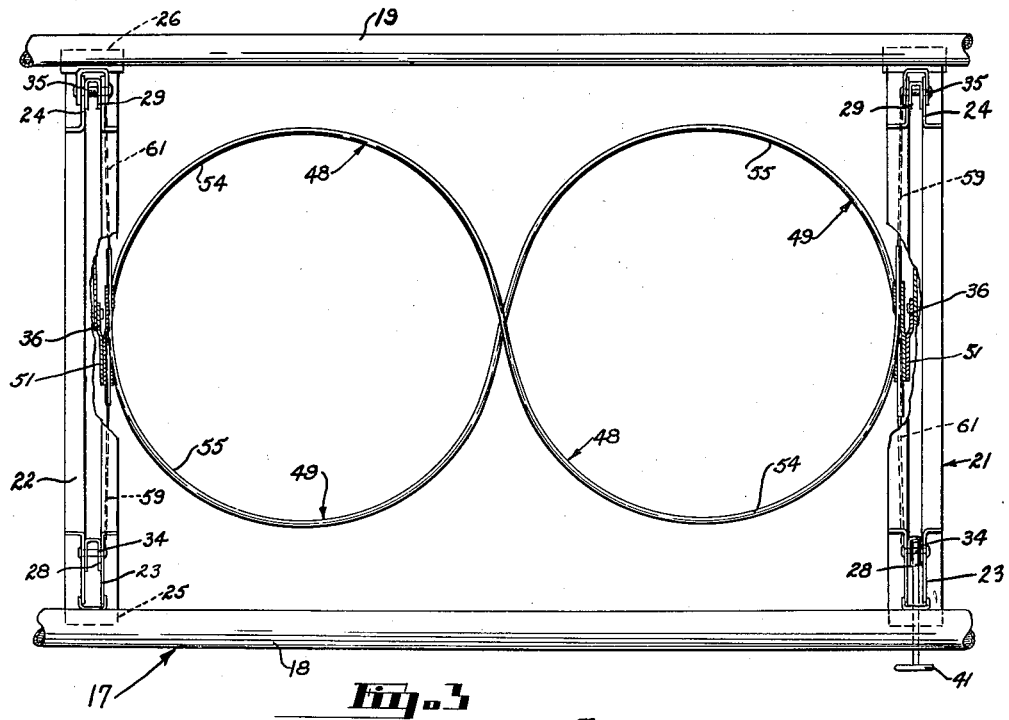
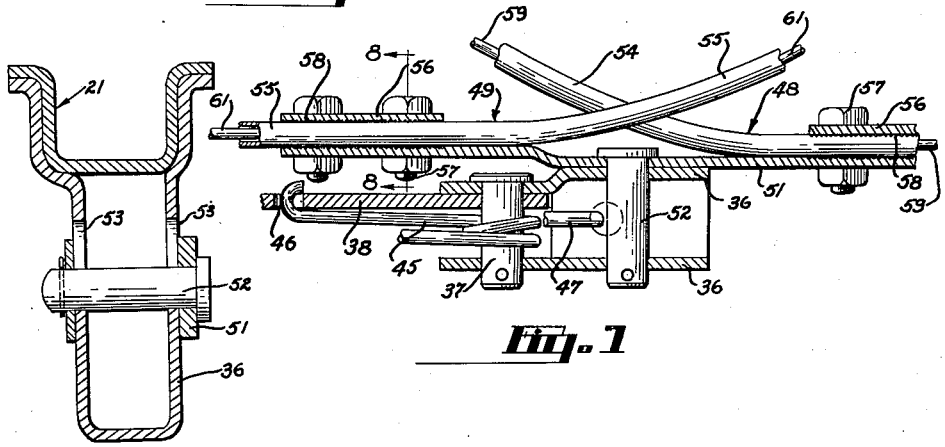
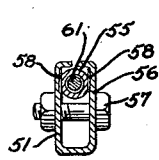
E.D. SCOTT
E.A. HERIDER
INVENTORS.
BY
E.C. McRae
R.G. Harris
J.R. Faulkner
T.H. Oster
ATTORNEYS.

Patented Nov. 27, 1951

2,576,365

UNITED STATES PATENT OFFICE 2,576,365

ADJUSTABLE VEHICLE SEAT

Edwin D. Scott, Plymouth, and Elmer A. Herider, Dearborn, Mich., assignors to Ford Motor Company, Dearborn, Mich., a corporation of Delaware Application June 5, 1946, Serial No. 674,570

9 Claims. (Cl. 155—14)

This invention relates generally to vehicle seats and has particular reference to vehicle seats of the type adjustable longitudinally of the vehicle and adapted to be locked in selected positions.

It is customary to mount the front seat of an automotive vehicle for adjustment longitudinally with respect to the steering wheel and controls of the automobile, to provide comfortable accommodations for drivers of various heights. This adjustment is usually obtained by mounting the seat upon cooperating slides and rails, or by pivotally mounting the seat upon short links which in turn are pivotally connected to the floor of the vehicle. Due to the width of the seat and the weight thereof, it is usually necessary to provide for movement of the opposite sides of the seat in unison to maintain alignment of the seat and permit the longitudinal adjustment thereof to be made with desired ease. A common manner for providing simultaneous movement of opposite sides of the seat has been to mount a gear upon each end of a transversely extending rotatable shaft, with the gears meshing with longitudinally extending racks carried by the seat structure. Although workable, this latter construction is expensive to manufacture and materially adds to the cost of the seat structure.

It is an object of the present invention to provide a mounting for an adjustable vehicle seat which is simplified in construction and inexpensive to manufacture, yet which achieves the desired result of rigidly supporting the seat, permitting easy adjustment of the seat longitudinally of the vehicle, and insuring simultaneous longitudinal movement of opposite sides of the seat during the adjustment thereof. This objective is obtained in the present invention by mounting the seat upon generally vertically extending links pivotally connected to the vehicle floor and to the seat frame, and interconnecting the opposite sides of the seat frame by a conduit and wire assembly so arranged that movement of one side of the seat results in simultaneous and equal movement of the opposite side of the seat.

Proper control and stabilization of the seat during adjustment thereof results from a construction including a semi-rigid hollow tube extending generally transversely of the seat and bent so that one end is directed forwardly and the opposite end directed rearwardly, with the opposite ends thereof operatively connected to portions of the seat frame at opposite sides of the seat. A flexible wire extends through the tube and projects a substantial distance beyond the opposite ends of the tube, with one end of the wire being connected to the front supporting link at one side of the seat and the other end of the wire being connected to the rear supporting link at the other side of the seat. Relative movement between the wire and tube occurs as the seat is moved longitudinally, and the opposite sides of the seat are constrained to move simultaneously in the same direction and the same distance.

Applicants are aware of the fact that it has been heretofore suggested that a seat of the slide and rail adjustment type can be equipped with Bowden wire assemblies in an effort to secure simultaneous adjustment of opposite sides of the seat. An inherent disadvantage of this type of construction is that the coiled wire casing of the Bowden wire assembly inherently contains a certain amount of slack which must be taken up when the casing is placed under compression. This results in lost motion or lag which impairs the proper operation of the structure, and prevents an initial simultaneous movement of opposite sides of the seat. Since the solid tube used by the present invention contains no slack, it immediately transmits compression forces, and there is no lost motion or lag. In addition, the tube and wire assembly operates with less frictional drag than the cable and wire assembly, resulting in a smoother and easier operating seat adjuster.

A further feature of the present invention is the utilization of a tube and wire assembly of this type in combination with a vehicle seat mounted for longitudinal adjustment upon front and rear pivoted links. Not only is this overall construction considerably simpler and less costly to manufacture than the structures heretofore suggested or in use, but it lends itself to assembly as a unit and to simple installation in the vehicle, and in addition is not likely to become fouled with an accumulation of dirt or foreign matter as frequently occurs with adjustable seats of the slide and rail type.

Still another feature of the invention is the provision of an adjustable vehicle seat utilizing a tube and wire assembly to insure simultaneous movement of opposite sides of the seat, in which the wire and tube are respectively connected to portions of the seat structure movable at different rates during the adjustment of the seat, so that differential movement occurs between the wire and tube. This effects the desired coordination of movement of opposite sides of the seat, and permits a simpler construction and wider latitude of design in connection with seats of different types, since with this arrangement it is not necessary to anchor one element of the tube and wire assembly to a fixed part of the seat mounting.

The invention also includes an arrangement for maintaining the mounting for the ends of the wires and tubes in alignment with each other during the angular movement of the supporting links and the seat about the pivotal axes between the links and the vehicle floor.

Other objects and advantages of this invention will be made more apparent as this description proceeds, particularly when considered in connection with the accompanying drawings, in which:

Figure 1 is a fragmentary side elevational view of an automobile, with a portion of the front door broken away to show the adjustable front seat thereof.

Figure 2 is a side elevational view of the seat and mounting therefor, with the frame partially broken away and in section.

Figure 3 is a plan view of the structure shown in Figure 2, viewed from in front of the seat.

Figure 4 is a cross sectional view taken substantially on the plane indicated by the line 4—4 of Figure 2.

Figure 5 is a fragmentary cross sectional view taken substantially on the plane indicated by the line 5—5 of Figure 4.

Figures 6 and 7 are cross sectional views taken substantially on the planes indicated by the lines 6—6 and 7—7 of Figure 2.

Figure 8 is a cross sectional view taken substantially on the plane indicated by the line 8—8 of Figure 7.

Referring now to the drawings, and particularly to Figure 1, there is illustrated an automobile 11 having the conventional steering wheel 12, front door 13, and front seat 14. The front seat 14 comprises the horizontal and upright seat cushions 15 and 16 respectively, and is mounted upon the frame indicated generally at 17 and best seen in Figures 2 and 3.

The seat frame 17 is of the tubular type, and has tubes 18 and 19 forming the front and rear rails thereof. Interconnecting the front and rear rails 18 and 19 at opposite sides of the seat are a pair of longitudinally extending frame members 21 and 22. The frame members are generally U-shaped in cross section throughout their center section and have enlarged front and rear flanges 23 and 24, at the outer extremities of which are welded arcuate brackets 25 and 26. The arcuate brackets 25 and 26 are arranged to support the front and rear tubular rails 18 and 19 respectively of the frame, the latter being secured to the arcuate brackets by means of bolts 27.

The seat frame 21 is adjustably mounted for longitudinal movement upon a pair of front supporting links 28 and a pair of rear supporting links 29. The links 28 and 29 are generally U-shaped in cross section and are pivotally connected at their lower ends to brackets 31 by means of pivot pins 32. The brackets 31 in turn are welded or otherwise suitably secured to the floor 33 of the vehicle. The upper portions of the links 28 extend between the front flanges 23 of the frame members 21 and 22, being guided therebetween to impart lateral stability to the seat mounting. At their upper ends, the links 28 are pivotally connected to the frame members by means of pivot pins 34. The rear supporting links 29 similarly extend between the enlarged flanges 24 of the frame members 21 and 22 and are pivotally connected at their upper ends to the frame members by means of pivot pins 35.

Depending from each frame member 21 substantially at the center thereof is a bracket 36, the latter being preferably spot welded to the frame member. The bracket 36 on the frame member 21 at the left or driver's side of the seat carries a pivot pin 37, best seen in Figures 2 and 7, upon which is pivoted a locking lever 38. The locking lever 38 projects forwardly through a slot 39 formed in the web of the forward link 28, and carries at its forward extremity an operating handle 41 which extends upwardly within reach of the driver. A plurality of teeth formed upon the lower surface of the locking lever 38 are adapted to be selectively engaged by a pin 43 extending through the front link 28. With reference to Figure 4, it will be noted that the pin 43 has a square section 44 adapted to fit into a square hole in the link 28 to prevent the pin from turning, and that intermediate its ends the opposite sides of the pin are cut away as shown in Figure 5 to form a section corresponding in shape to the notches 42 for engagement therewith. The locking lever 38 is continually urged downwardly into engagement with the pin 43 by means of a spring 45, which, as seen in Figure 7, is coiled around the pin 37 and has opposite ends engageable with an opening 46 in the locking lever 38 and with the bottom of the frame member 21 respectively.

It will be apparent from the foregoing description that upward movement of the handle 41 by the driver frees the lever 38 from locking engagement with the pin 43 and permits the seat to be freely adjusted longitudinally by swinging the seat about the links 28 and 29. Since it is normally easier for the driver to move the seat rearwardly than to move it forwardly, a biasing spring 47 is used to assist the forward movement of the seat, having its opposite ends connected to the pin 32 in the forward floor bracket 31 and the bottom of the bracket 36 depending from the frame member 21.

With the construction thus far described, longitudinal adjustment of the seat is possible, but no means other than the inherent stiffness of the seat frame itself are provided to insure simultaneous movement of opposite sides of the seat in each direction and to prevent binding of the seat during adjustment. In the present invention, these problems are met by a construction best shown in Figures 2, 3 and 7, which show a pair of tube and wire assemblies connected between opposite sides of the seat structure. Although it will be understood that this construction is equally operable with a single tube and wire assembly, there is shown in the drawings a pair of such assemblies 48 and 49 to obtain the maximum control and adjustment of the seat. Each assembly includes a semi-rigid hollow tube bent in a generally S-shape and having its opposite ends mounted upon arms 51, one such arm 51 being pivotally connected intermediate its ends to each of the brackets 36 depending from the center of the frame members 21 and 22. The pivotal connection between each arm 51 and the adjacent bracket 36 comprises a pivot pin 52 which is vertically movable in a slot 53 formed in opposite sides of the bracket 36.

Referring now to Figure 3, it will be seen that the tube 54 of the assembly 48 has one end extending forwardly and connected to the forward end of the arm 51 at one side of the seat and the opposite end extending rearwardly and connected to the rearward end of the arm 51 at the opposite side of the seat. The tube 55 of the assembly 49 is similar in shape to the tube 54, but oppositely disposed with respect thereto, being connected adjacent its opposite ends to the remaining ends of the arms 51. The outer extremities of the arms 51 are each provided with a flange 56 bent upwardly to a position parallel with the body of the arm 51. Bolts 57 extend through the flange 56 and the body of the arm 51 and serve when tightened to clamp the tube therebetween. Serrations 58 are formed upon the cooperating inner surfaces of the flange and arm to bite into the tube and assist in holding the latter firmly in position. It will be noted that each end of the tubes 54 and 55 extends a short distance beyond the end of the arm 51, to provide as much support as possible for the wires extending therefrom.

Flexible solid wires 59 and 61 extend through the tubes 54 and 55 respectively, and project a substantial distance beyond the opposite ends of the tubes. The ends of the wires are formed with loops which are connected to pins passing through the links 28 and 29 to anchor the ends of the wires. The forwardly extending ends of the wires 59 and 61 are connected to the pins 43 extending through the front links 28, whereas the rearwardly extending ends of the wires are connected to pins 62 extending through the rear links 29.

Although various types of tubes can be used, it has been found practical to utilize a thin-walled tube which can be readily bent to the desired shape. A slight amount of clearance is provided between the interior diameter of the tube and the exterior diameter of the wire to facilitate movement therebetween, and in addition, lubrication may be inserted between the tube and wire during assembly. After the tube and wire assemblies have been assembled with the seat, the tubes may be fastened by wire clips or other suitable means to the frame or springs of the seat, to support the tubes and prevent interference with other objects.

Operation

As noted from the drawings and the above description, the opposite ends of the wires 59 and 61 are connected to the front and rear links 28 and 29 at points intermediate the ends of the latter and above the pivotal connections 32 with the floor brackets 31. Thus, during longitudinal adjustment of the seat, the ends of the wires are also movable longitudinally, but to a more limited extent and at a slower rate than the movement of the seat itself. This is necessarily true because of the longer effective lever arm upon which the seat is pivotally mounted as compared to the shorter lever arm from the pivot pin 32 to the points of connection between the wires and the links. As a result, differential movement is effected between the tubes and their respective wires.

Analyzing the action of the tube and wire assembly 48 alone during adjustment of the seat, it will be seen that during forward movement of the driver's side of the seat (as shown at the right in Figure 3) the tube 54 of the assembly is placed in compression and is movable relative to the wire 59 to exert a forward force upon the arm 51 at the opposite side of the seat, resulting in an equal and simultaneous movement of that side of the seat. At the same time the wire 59 within the tube 54 is placed under tension, and the resulting relative movement between the wire and tube is effective to cause the opposite side of the seat to move in unison with the driver's side without any lag or lost motion. During rearward movement of the driver's side of the seat, the tube 55 is placed under compression and the wire 61 in tension, and the relative movement between the two achieves simultaneous movement of both sides of the seat. It will be apparent that the tubes are superior in operation to flexible cables since the tubes are solid and have no lost motion to be taken up when placed in compression, as in cables.

An important point to note is that the slots 53 in the brackets 36 on the seat provide for relative vertical movement between the arms 51 and the seat during adjustment of the latter. With this arrangement the pivot pins 43, 52 and 62 are automatically maintained in alignment even though they follow arcs of different radii during swinging movement of the seat about the pivot pins 32.

It will be understood that while the tubes are shown connected to the seat frame and the wires connected to the links, this arrangement can be reversed if desired. It is also within the contemplation of the invention to anchor the ends of one of the elements of the wire and tube assemblies to the floor brackets rather than to the supporting links.

Assembly of the seat structure during production is facilitated by the present construction, since the tube and wire assemblies can be preassembled with the arms 51, and the resulting sub-assembly installed in the seat structure as a unit simply by attaching the arms 51 to the brackets 36 by the pins 52. If, after assembly, any adjustment is necesary, this can readily be effected by loosening one or more pairs of the bolts 57 clamping the tubes to the arms 51, and moving the tubes relative to the arms.

It will be understood that the invention is not to be limited to the exact construction shown and described, but that various changes and modifications may be made without departing from the spirit and scope of the invention, as defined in the appended claims.

What is claimed is:

1. In an adjustable vehicle seat, a seat frame, a supporting structure at each side of said seat frame, each of said supporting structures comprising a pair of longitudinally spaced links pivoted at their lower ends to a support beneath said seat frame and at their upper ends to said seat frame, a curved noncompressible and nonextensible solid conduit extending generally transversely of said vehicle adjacent said seat frame and connected at opposite ends to said seat frame with one end directed forwardly and the other end directed rearwardly, and a flexible wire extending through said conduit and projecting a substantial distance beyond the opposite ends of said conduit, the opposite extremities of said flexible wire being connected to the links at opposite sides of said seat frame.

2. In an adjustable vehicle seat, a seat frame, a supporting structure at each side of said seat frame, each of said supporting structures comprising a pair of longitudinally spaced links pivoted at their lower ends to a support beneath said seat frame and at their upper ends to said seat frame, a curved conduit extending generally transversely of said vehicle adjacent said seat frame and connected at opposite ends to said seat frame with one end directed forwardly and the other end directed rearwardly, and a flexible wire extending through said conduit and projecting a substantial distance beyond the opposite ends of said conduit, the opposite extremities of said flexible wire being connected to said links intermediate the pivotal axes of the latter.

3. In an adjustable vehicle seat, a seat frame, a supporting structure at each side of said seat frame, each of said supporting structures comprising a pair of longitudinally spaced links pivoted at their lower ends to a support beneath said seat frame and at their upper ends to said seat frame, a substantially S-shaped conduit extending generally transversely of said vehicle adjacent said seat frame and having its opposite ends connected to said seat frame with one end directed forwardly and the opposite end directed rearwardly, and a flexible wire extending through said S-shaped conduit and projecting a substantial distance beyond the opposite ends of said conduit, the projecting ends of said wire being connected to links at opposite sides of said seat frame with each point of connection to a link being intermediate the pivotal axis between the link and said support and the pivotal axis between the link and said seat frame respectively.

4. In an adjustable vehicle seat, a seat frame, a supporting structure at each side of said seat frame, each of said supporting structures comprising a pair of longitudinally spaced links pivoted at their lower ends to a support beneath said seat frame and at their upper ends to said seat frame, a pair of arms pivotally connected to said seat frame adjacent opposite sides thereof, a clamp carried by each of said arms, a curved conduit extending between the arms at opposite sides of said seat frame and connected thereto by means of said clamps with one end of said conduit being directed forwardly and the opposite end being directed rearwardly, a flexible wire extending through said conduit and projecting a substantial distance beyond the opposite ends of said conduit, and means connecting the opposite extremities of said wire to links at opposite sides of said seat frame at points substantially in alignment with each other and with the pivotal axes of said arms.

5. The structure defined by claim 4 which is further characterized in that the pivotal axes of said arms are mounted for limited movement in a vertical direction to maintain said axes and the points of connection between said wire and said links substantially in alignment during angular movement of said links about their pivotal connections with said support.

6. In an adjustable vehicle seat, a seat frame, a pair of longitudinally spaced links at each side of said frame for movably supporting the latter, each of said links being pivoted at its lower end to a support beneath said seat frame and at its upper end to said seat frame, brackets at opposite sides of said seat frame, a pair of individual arms pivotally connected to each of said brackets with their pivotal axes mounted for limited vertical movement, a pair of substantially S-shaped conduits extending generally transversely of said vehicle beneath said seat frame, said conduits being oppositely arranged and connected at their opposite ends to said arms with one end of each conduit extending forwardly and the opposite end of each conduit extending rearwardly, and a pair of flexible wires extending through said conduits with the opposite ends of said wires projecting a substantial distance beyond the ends of the conduits and connected to said links at points intermediate the pivotal connection of said links to said supports and to said seat frame, the points of connection of said wires to said links and the pivotal axes of said arms upon said brackets being substantially in horizontal alignment with each other.

7. In an adjustable vehicle seat, a seat frame, a pair of longitudinally spaced links at each side of said frame for movably supporting the latter, each of said links being pivoted at its lower end to a support beneath said seat frame and at its upper end to said seat frame, brackets depending from said seat frame adjacent opposite sides thereof, supporting means carried by said brackets, a curved hollow conduit extending beneath said seat frame and connected at its opposite ends to said supporting means with one end of said conduit extending forwardly and the opposite end of said conduit extending rearwardly, a flexible wire extending through said hollow conduit and connected at opposite ends to said links between the pivotal axes of said links, the connection between one end of said flexible wire and one of said links comprising a horizontally extending pin mounted upon said last-mentioned link, and an arm pivotally mounted upon one of said brackets and having a series of notches along one edge for selective engagement with said pin to lock said vehicle seat in adjusted position.

8. Adjusting mechanism for a vehicle seat of the type having a generally rectangular frame, comprising, a longitudinally extending brace at each side of said seat frame extending between the front and rear rails of said frame and connected thereto, a pair of generally vertical links pivotally connected to each of said braces adjacent the front and rear ends thereof, brackets mounted upon the floor of the vehicle and pivotally connected to the lower ends of said links, brackets depending from said braces near the middle thereof, supporting means mounted upon said brackets for limited movement in a vertical direction, a pair of oppositely positioned S-shaped hollow tubes extending beneath said seat frame and said braces and connected at opposite ends to said supporting means, flexible wires extending through said tubes and connected at their ends to said links at points between the pivotal axes of said links and in horizontal alignment with the points of connection between said tubes and said supporting means, said tubes and wires being arranged so that the rearward end of each wire is connected to the rearward link at one side of said seat and the forward end connected to the forward link at the opposite side of said seat, spring means for urging said seat forwardly, and a locking lever pivotally mounted upon one of the brackets depending from said brace and having means engageable with a pin carried by one of the forward links to lock said seat in one of a plurality of adjusted positions.

9. In an adjustable vehicle seat, a support, a seat frame structure, an adjusting structure movably supporting said seat frame upon said supports for movement longitudinally of said vehicle, a pair of attaching elements carried by said seat frame structure and movable therewith, said adjusting structure having portions located intermediate said seat frame structure and said support and movable longitudinally at a slower rate than said seat frame structure as the latter is adjusted longitudinally of said vehicle, a second pair of attaching elements carried by said intermediate portions of said adjusting structure, a hollow tube having its opposite ends connected to one of said pairs of elements, said tube being bent with one end directed forwardly and the other end directed rearwardly, and a flexible wire within said tube projecting beyond the opposite ends of the tube and having its projecting end portions connected to the other of said pairs of elements.

EDWIN D. SCOTT.
ELMER A. HERIDER.

REFERENCES CITED

The following references are of record in the file of this patent:

UNITED STATES PATENTS

| Number | Name | Date |
| --- | --- | --- |
| 2,149,946 | Whedon et al. | Mar. 7, 1939 |
| 2,215,012 | McGregor | Sept. 17, 1940 |
| 2,260,032 | Kaiser et al. | Oct. 21, 1941 |
| 2,360,805 | Thoma | Oct. 17, 1944 |